United States Patent [19]

Lehmann et al.

[11] Patent Number: 4,488,732
[45] Date of Patent: Dec. 18, 1984

[54] CHASSIS FOR SELF-PROPELLED AGRICULTURAL MACHINE

[75] Inventors: Heinz Lehmann; Heinz Rossnik; Reinhard Blumenthal, all of Schönebeck, German Democratic Rep.

[73] Assignee: Veb Kombinat Fortschritt Landmaschinen Neustadt in Sachsen, Neustadt in Sachsen, German Democratic Rep.

[21] Appl. No.: 459,196

[22] Filed: Jan. 19, 1983

[30] Foreign Application Priority Data

Jan. 20, 1982 [DD] German Democratic Rep. .................................. 2368626

[51] Int. Cl.$^3$ ............................................. B62D 21/00
[52] U.S. Cl. .................................. 280/781; 296/190; 296/204
[58] Field of Search ............... 280/781, 785, 790, 795, 280/796, 797, 798, 799, 800; 296/190, 204

[56] References Cited

U.S. PATENT DOCUMENTS

| | | | |
|---|---|---|---|
| 3,133,655 | 5/1964 | Gardner | 280/781 |
| 3,977,489 | 8/1976 | Cole et al. | 280/781 |
| 4,040,640 | 8/1977 | Begg | 280/785 |
| 4,120,511 | 10/1978 | Allen et al. | 280/795 |
| 4,163,578 | 8/1979 | Watson | 280/781 |
| 4,191,401 | 3/1980 | Krolak et al. | 280/781 |

*Primary Examiner*—Robert R. Song
*Attorney, Agent, or Firm*—Karl F. Ross; Herbert Dubno

[57] ABSTRACT

A chassis for a self-propelled agricultural machine adapted to travel in a predetermined longitudinal horizontal direction basically comprises a lower frame, a middle frame spaced above the lower frame and offset somewhat therefrom, and an upper frame spaced above the middle frame and offset horizontally therefrom. The lower frame has a pair of longitudinally extending rigid lower side beams having outwardly offset rear ends and a plurality of longitudinally spaced and transversely extending lower cross beams fixed to and bridging the lower side beams. The middle frame has respective transversely spaced front posts fixed to the lower side beams, respective transversely spaced rear posts fixed to the lower side beams behind the front posts, respective middle longitudinal side beams fixed to the upper ends of the respective posts above the lower side beams and having front ends projecting forward of the front posts relative to the travel direction, and respective front and rear middle cross beams fixed to the middle side beams and projecting transversely beyond the side beams. The upper frame has respective transversely spaced upper front posts extending up from the middle side beams, respective transversely spaced upper rear posts fixed to and extending up from the middle side beams behind the upper front posts, respective upper transversely spaced upper side beams fixed to the upper ends of the upper posts and projecting forwardly beyond the front upper posts, and respective upper longitudinally spaced front and rear cross beams extending between the upper side beams.

7 Claims, 2 Drawing Figures

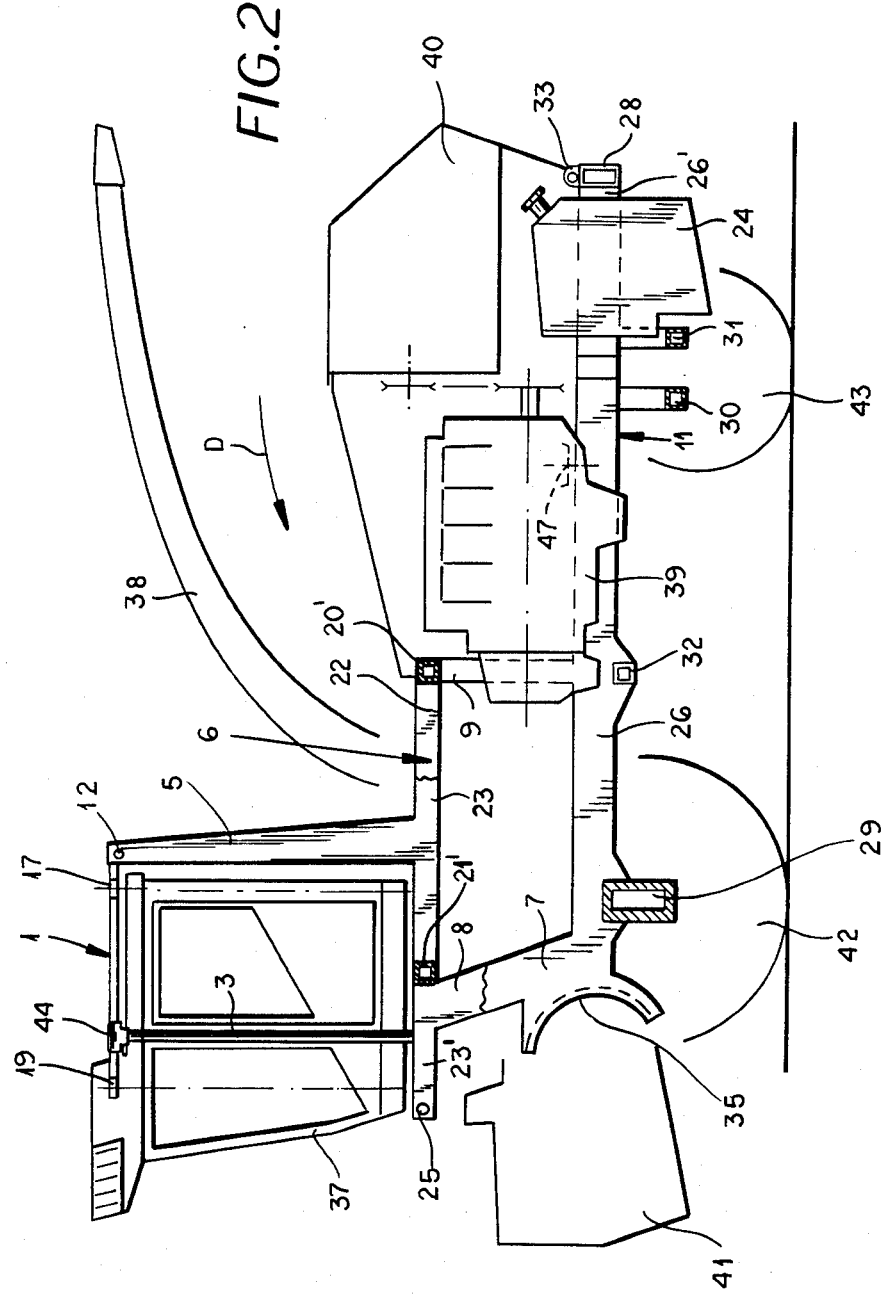

CHASSIS FOR SELF-PROPELLED AGRICULTURAL MACHINE

FIELD OF THE INVENTION

The present invention relates to a chassis for a self-propelled vehicle or machine. More particularly this invention concerns an agricultural machine such as a harvester or combine.

BACKGROUND OF THE INVENTION

A self-propelled agricultural machine such as a thresher, combine, or field chopper must have a rigid chassis supporting the engine, the fuel tank, the intake device, the treatment (e.g. threshing, chopping) equipment, the operator cabin, and normally some sort of conveyor or baler for the crop. In addition the operator cabin must be held in a location giving the operator a good vantage point of whatever is being done.

Typically a flat generally rectangular frame is used to support everything. This is the system shown in East German Pat. No. 75,665 issued Apr. 20, 1972 to K. Oliva et al which has three parallel longitudinal beams on which all the equipment is secured. Another such structure is seen in East German Pat. No. 104,902 issued Apr. 5, 1974 to V. Miratsky et al, one that is intended for use by different types of machinery. These systems are disadvantageous because it is frequently difficult to gain access to some parts of the machinery without removing others, that stand in the way or surround them.

In particular such a general-use chassis can rarely support a large front-end intake unit well. East German Pat. No. 112,705 of K. Oliva describes an arrangement for doing this which is complex in the extreme, making servicing quite difficult. Similarly the arrangement of German Pat. No. 2,412,461 of F. Schollhorn et al requires a very complicated chassis for carrying a front-end intake unit.

Another disadvantage of the known machines is that the operator cabin normally sits on top of the whole chassis. In this position it is subject to all of the vertical jarring and transverse swaying and shaking to which such a heavy-duty machine is prone. Such arrangements can be seen in German patent documents Nos. 2,935,274, 3,011,232, and 3,011,089 respectively of A. Grunecker et al, F. Philips et al, and E. Priepke et al, the latter two citing as priority U.S. application Ser. Nos. 26,499 and 26,500 of 1979. Operator efficiency falls off considerably when the operator cabin is subjected to such movements.

OBJECTS OF THE INVENTION

It is therefore an object of the present invention to provide an improved chassis for a self-propelled machine.

Another object is the provision of such a chassis for a self-propelled machine which overcomes the above-given disadvantages.

A further object is such a chassis which can be used for a variety of agricultural and construction machines, yet which serves all such functions well.

Yet another object is to provide such a chassis which holds the various pieces of equipment necessary to the machine it is part of in such a way that they can be worked on independently without having to remove one for access to another.

SUMMARY OF THE INVENTION

These objects are attained according to the instant invention in a chassis for a self-propelled agricultural machine adapted to travel in a predetermined longitudinal horizontal direction. The chassis basically comprises a lower frame, a middle frame spaced above the lower frame and offset somewhat therefrom, and an upper frame spaced above the middle frame and offset horizontally therefrom. The lower frame has a pair of longitudinally extending rigid lower side beams having outwardly offset rear ends and a plurality of longitudinally spaced and transversely extending lower cross beams fixed to and bridging the lower side beams. The middle frame has respective transversely spaced front posts fixed to the lower side beams, respective transversely spaced rear posts fixed to the lower side beams behind the front posts, respective middle longitudinal side beams fixed to the upper ends of the respective posts above the lower side beams and having front ends projecting forward of the front posts relative to the travel direction, and respective front and rear middle cross beams fixed to the middle side beams and projecting transversely beyond the side beams. The upper frame has respective transversely spaced upper front posts extending up from the middle side beams, respective transversely spaced upper rear posts fixed to and extending up from the middle side beams behind the upper front posts, respective upper transversely spaced upper side beams fixed to the upper ends of the upper posts and projecting forwardly beyond the front upper posts, and respective upper longitudinally spaced front and rear cross beams extending between the upper side beams.

The lower frame projects back beyond the middle frame and the middle frame projects back beyond the upper frame according to this invention. In addition the middle frame projects horizontally in all directions beyond the upper frame and the lower frame projects backward from the intermediate frame. This provides a great deal of area on which to mount the various elements of whatever self-propelled machine is going to incorporate the chassis. The various subassemblies can be rationally placed where they are most efficient or convenient. Since the main structure of the frame extends in three dimensions, the potential locations for mounting the various pieces of equipment is great, allowing a standard chassis to serve many different uses well.

The lower side beams according to this invention are adapted to carry the driven and steered axles, normally the former ahead of the latter for smallest possible turning radius. In addition to carry an intake device the lower side beams have front ends forming forwardly open seats in which the ends, for example, of a reel can be journaled.

According to another feature of this invention the lower cross beams include a rear cross beam extending between the rear ends of the lower side beams and formed with at least two pivots. A rear-end drive or subassembly can be carried easily on these pivots. A large-capacity fuel tank can be accommodated between the widely spaced rear ends of the lower side beams in a very safe position. The engine and other heavy components such as pumps and generators can sit on one or more central cross beams of the lower frame to give the machine a low center of gravity.

To front-mount the intake device, according to this invention the projecting front ends of the middle side beams are provided with pivots. In this manner any type of intake with its raising and lowering device can easily be accommodated.

The upper beams of the upper frame are provided according to this invention with hanger attachments. An operator cabin such as described in East German patent document No. 141,769 hangs from them, normally in such a manner as to mainly insulate the operator from the swaying and jarring motions of the machine which is usually used on uneven terrain.

DESCRIPTION OF THE DRAWING

The above and other features and advantages will become more readily apparent from the following, reference being made to the accompanying drawing in which:

FIG. 2 is a partly diagrammatic and partly longitudinal sectional view of the chassis of FIG. 1.

SPECIFIC DESCRIPTION

Figure 1:
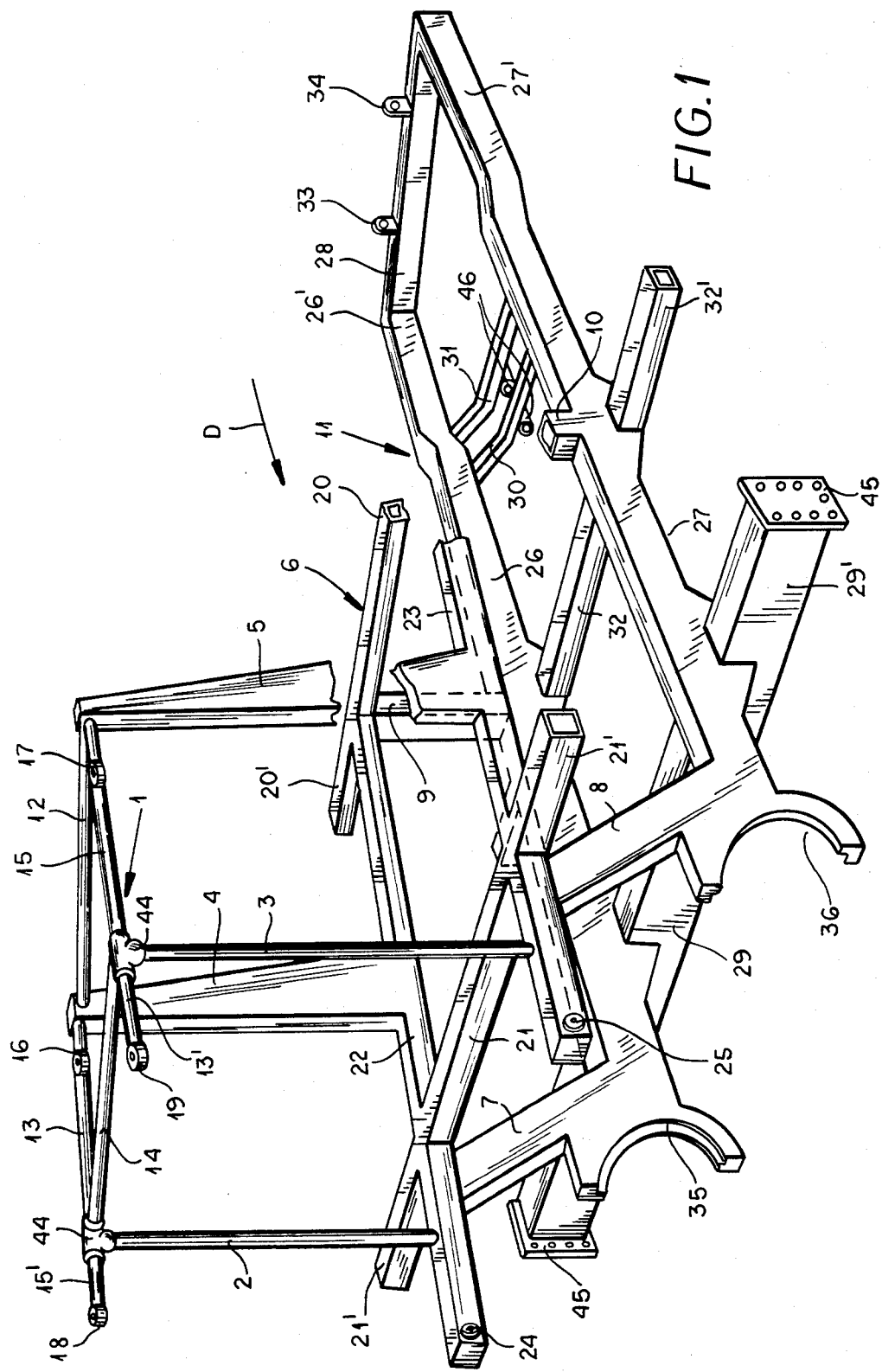
FIG. 1 is a partly broken-away perspective view of a chassis according to this invention.

As seen in the drawing the chassis according to this invention basically comprises an upper frame 1, a middle or intermediate frame 6, and a lower or base frame 11. The upper frame 1 is generally parallepipedal and downwardly closed by the intermediate frame 6, which itself is generally parallepipedal and downwardly closed by the elongated and horizontal lower frame 11. Each frame extends backward of the overlying frame, and the lower frame 11 starts, relative to the normal travel direction D of the chassis 1, 6, 11, behind the fronts of the middle and upper frames 6 and 1.

The upper frame 1 is constituted by two vertical front posts 2 and 3, two large and very rigid rear posts 4 and 5, and four rectangle-forming beams 12–15 which are made, like the posts 2 and 3, of cylindrical pipe. Fittings 44 join the upper ends of the front beams 2 and 3 to the outer ends of the front transverse beam 14 and to the longitudinal side beams 13 and 15 which have cantilevered ends 13' and 15' extending forward of the fittings 44. Ahead of the rear posts 4 and 5 the members 13 and 15 are formed with vertically open hanger eyes 16 and 17 and at their extreme front ends with such hangers 18 and 19.

The top of the middle frame 6, which as mentioned above closes the bottom of the top frame 1, is formed by two parallel longitudinal square-section beams 22 and 23 fixed to the respective rear posts 4 and 5 and carrying the lower ends of the front posts 2 and 3, and by two transverse beams 20 and 21. The beams 22 and 23 have front ends 22' and 23' that are cantilevered forward beyond the lower frame 11 and formed with bearings 24 and 25. Similarly the transverse beams 20 and 21 have ends 20' and 21' that project horizontally to both sides of the longitudinal beams 22 and 23 to support platforms suitable for carrying elements of the machine.

Extending down from the junctions of the side beams 22 and 23 with the rear beam 20 are two large square section rear posts 9 and 10 that stand on the lower frame 11. Extending down and back, relative to the travel direction D, from the beams 22 and 23 from slightly ahead of the cross beam 21 are front posts 7 and 8 formed like the posts 4 and 5 of large rectangular cross section, but not tapered upward like these posts 4 and 5.

The lower frame 11 has two longitudinally extending side beams 26 and 27 to whose front ends are fixed the lower ends of the front posts 7 and 8 of the middle frame 6, and to whose middles are fixed the lower ends of the posts 9 and 10. These two beams 26 and 27 are bridged underneath the posts 4 and 5 by a massive cross member 29 having cantelevered ends 29' fitted with flat attachment flanges 45, underneath the beam 20 by a similar square-section beam 32 having cantilevered ends 32' and at the rear by a cross beam 28 of the same size and section as the rear ends 26' and 27' of the beams 26 and 27, which ends 26' and 27' are spread laterally somewhat. At the location where the ends 26' and 27' start the beams 26 and 27 are bridged underneath by two cross members 30 and 31 provided with bearings 46. The rearmost cross beam 28 is provided with two transversely spaced and aligned eyes 33 and 34. The front ends of the beams 26 and 27 are formed with forwardly open semicircular seats 35 and 36.

Suspended from the hanger eyes 16–19 is a cabin 37 for the machine operator, preferably one of the type shown in East German patent document No. 141,769. Depending on the type of machine this cabin 37 can be open or closed, and can even be provided with auxiliary heating and/or air-conditioning equipment if necessary. The cabin 37 will be solidly supported, and supported to minimize swinging and vibration.

Mounted on the seats 35 and 36 is an element of the machine such as the intake reel 41 of a combine. This intake 41 can be further suspended from the eyes 24 and 25. Inside the frame 6 the threshing and conveying equipment, of which the exit conduit 38 is here shown, is mounted. The outer ends 20' and 21' support whatever equipment can or needs to be carried up here out of the way, such as for instance the tool box, muffler, or the like.

The front cross member 29 of the lower frame 11 supports the nonswiveling drive wheels 42 and the rear members 30 and 31 support the rear steered wheels 43. The engine 39 is supported at its front end on the cross member 32 and at its rear end on appropriate mounts 47 on the beams 26 and 27.

Safely tucked between the rear ends 26' and 27' of the beams 26 and 27 is a gas or other fuel tank 24, and pivoted on the eyes 33 and 34 is a rear-end power unit 40 driving the wheels 42 from the motor 39. The battery and stairs to mount to the cabin 37 are supported on platforms carried on the projecting ends 29' and 32'.

The chassis according to this invention can therefore accommodate virtually any normal assembly of drives and equipment needed for many different types of agricultural machines. It is rigid and inexpensive to make, and will serve various requirements all quite well. The three-dimensional shape not only makes the chassis very stiff, but also provides numerous rational places for mounting the necessary subassemblies.

We claim:

1. A chassis for a self-propelled agricultural machine adapted to travel in a predetermined longitudinal horizontal direction, the chassis comprising:
   a lower frame having
      a pair of longitudinally extending rigid lower side beams having outwardly offset rear ends, and
      a plurality of longitudinally spaced and transversely extending lower cross beams fixed to and bridging the lower side beams;
   a middle frame above the lower frame and having respective transversely spaced front posts fixed to the lower side beams, respective transversely spaced rear posts fixed to the lower side beams behind the front posts, respective middle longitudinal side beams fixed to the upper ends of the respective posts above the lower side beams and having front ends projecting forward of the front posts relative to the travel direction, and respective front and rear middle cross beams fixed to the middle side beams and projecting transversely beyond the side beams; and an upper frame above the middle frame and having respective transversely spaced upper front posts extending up from the middle side beams, respective transversely spaced upper rear posts fixed to and extending up from the middle side beams behind the upper front posts, respective upper transversely spaced upper side beams fixed to the upper ends of the upper posts and projecting forwardly beyond the front upper posts, and respective upper longitudinally spaced front and rear cross beams extending between the upper side beams.

2. The chassis defined in claim 1 wherein relative to the travel direction the lower frame projects back beyond the middle frame and the middle frame projects back beyond the upper frame.

3. The chassis defined in claim 1 wherein the lower side beams have front ends forming forwardly open seats.

4. The chassis defined in claim 1 wherein the lower cross beams include a rear cross beam extending between the rear ends of the lower side beams and formed with at least two pivots.

5. The chassis defined in claim 1 wherein the projecting front ends of the middle side beams are provided with pivots.

6. The chassis defined in claim 1 wherein the upper beams are provided with hanger attachments.

7. The chassis defined in claim 6, further comprising an operator cabin suspended from the attachments.

* * * * *